(No Model.)

S. MURRAY & C. EPPS.
LARD OR BUTTER CUTTER.

No. 507,028.   Patented Oct. 17, 1893.

UNITED STATES PATENT OFFICE.

SAMUEL MURRAY AND CHARLES EPPS, OF ST. GEORGE, CANADA.

LARD OR BUTTER CUTTER.

SPECIFICATION forming part of Letters Patent No. 507,028, dated October 17, 1893.

Application filed June 3, 1893. Serial No. 476,477. (No model.)

*To all whom it may concern:*

Be it known that we, SAMUEL MURRAY and CHARLES EPPS, of St. George, New Brunswick, Canada, have invented certain new and useful Improvements in Lard or Butter Cutters; and we do hereby declare the following to be a full, clear, and exact description of the invention, such as will enable others skilled in the art to which it pertains to make and use it, reference being had to the accompanying drawings, which form part of this specification.

Our invention relates to improvements in lard and butter cutters, and it consists in providing an elongated tube with a piston head movable longitudinally therein, as will be fully described hereinafter and especially referred to in the claim.

The object of our invention is to provide an improved implement for removing lard, butter or other similar commodities from tubs or vessels in which they may be packed.

Figure 1:
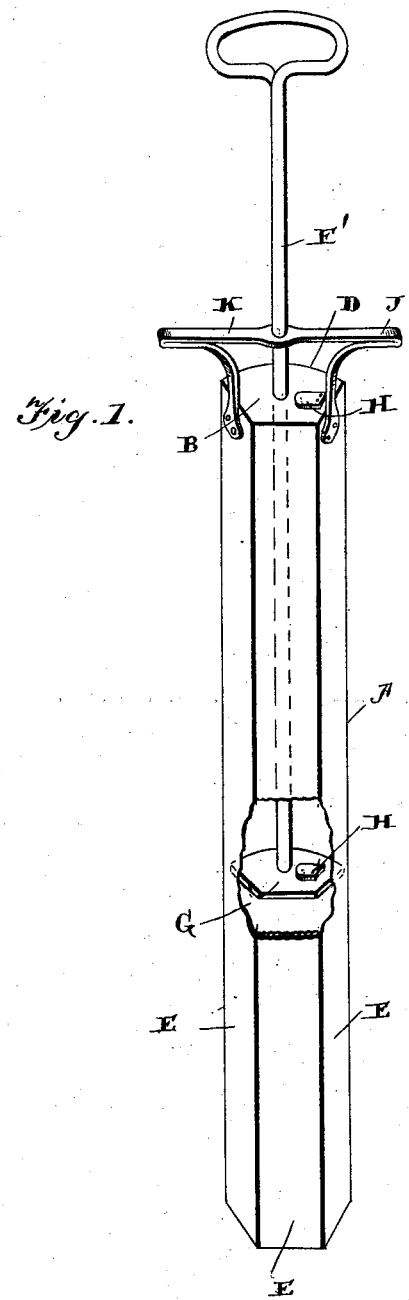
Figure 2:
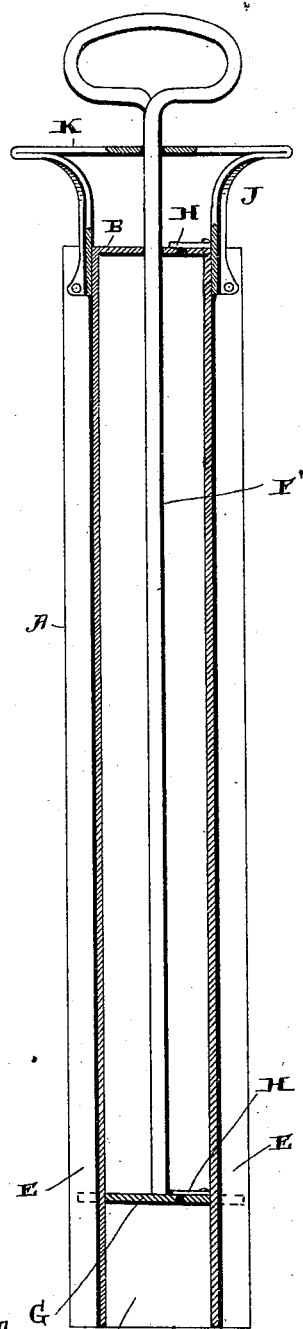
Figure 3:
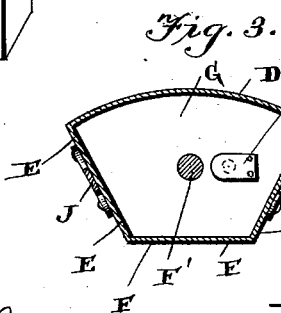

Referring to the accompanying drawings: Figure 1, is a perspective view of our improved device. Fig. 2, is a vertical sectional view of the same. Fig. 3, is a plan view.

A designates a tube formed preferably of tin or galvanized iron which is closed at its upper end as shown at B, and sharpened at its lower end as indicated at C, to form a knife or cutting edge. The tube is preferably of the form here shown with one convex side D, the straight side E converging from the respective edges of said convex side and the narrow side or wall F connecting the adjacent edges of the said converging side, thus completing the inclosure.

The device is adapted for removing butter from tubs of circular shape and the convex side of the tube is so constructed to conform as nearly as possible to the shape of the kind of tub in which it will be used. The converging sides are provided so that a series of blocks of lard or butter may be removed around the periphery of the tub without causing waste in cutting as will be readily understood.

G is a piston head movable vertically in tube A, by means of rod F', to the lower end of which it is secured and which rod extends upward through top B, where it is formed into a suitable operating handle, as shown. Head G and top B are provided with the small upwardly opening valve H through which the air confined in the tube may escape when the same is being forced downward into the material just prior to its removal. Upon an upward movement of the tube these valves close as will be readily understood and a partial vacuum being formed in the upper end thereof the removal of the material will be assisted by the consequent sucking action, as will be understood.

Handles J at the upper end of the tube are formed by turning inward and downward the end of the horizontal bar K which extends transversely across the tube's upper end, and which bar end is secured to the tube's side as shown. The device may thus be easily forced into the material by downward pressure on said handles and removed with equal ease by grasping the same.

When the tube and its contents have been removed from the tub the same may be emptied by pushing downward the piston head which discharges the material before it.

Having thus described our invention, what we claim, and desire to secure by Letters Patent, is—

An improved lard and butter cutter, comprising a tube having one convex side, two converging sides leading from the edges of the convex side, a narrow wall or side connecting the adjacent edges of the said converging sides, a piston head movable longitudinally in the tube, an upwardly opening valve carried thereby, an outwardly opening valve at the upper end of the tube, and a rod for operating the said head, substantially as shown and described.

In testimony whereof we affix our signatures in presence of two witnesses.

SAMUEL MURRAY.
    CHARLES EPPS.

Witnesses:
 JAMES O'BRIEN,
 TIMOTHY O'BRIEN, Jr.